Aug. 11, 1942.  M. A. KISE  2,292,879
PRODUCTION OF AROMATIC AMINES
Filed Aug. 5, 1939
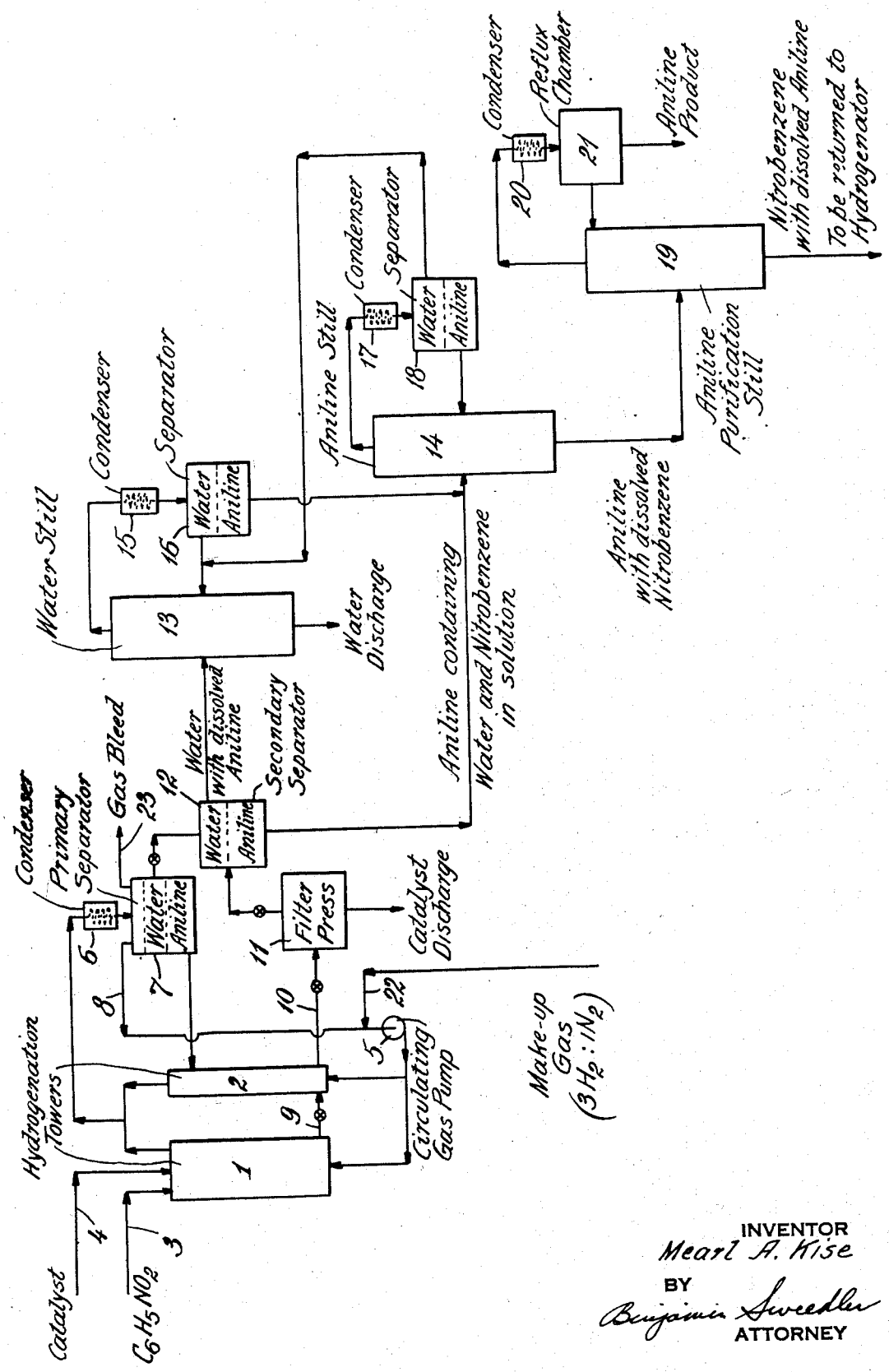
INVENTOR
Mearl A. Kise
BY
Benjamin Sweedler
ATTORNEY Patented Aug. 11, 1942

2,292,879

UNITED STATES PATENT OFFICE 2,292,879

PRODUCTION OF AROMATIC AMINES

Mearl A. Kise, Syracuse, N. Y., assignor to The Solvay Process Company, New York, N. Y., a corporation of New York Application August 5, 1939, Serial No. 288,545

11 Claims. (Cl. 260—580)

This invention relates to the production of aromatic amines by catalytic hydrogenation of aromatic nitro, nitroso, nitrosamino, diazo, azo, azoxy, hydrazo or beta-hydroxylamino compounds.

Aromatic amines, for example aniline, are in general produced commercially by reduction of the corresponding nitro compound by means of metallic iron and HCl or $FeCl_2$. This method is disadvantageous in that a large quantity of iron is required for the process, and separation of the aromatic amine from the large amounts of water and iron sludge formed in the reaction presents difficulties in operation. Other reducing agents such as ferrous salts, tin, zinc, soluble sulfides, sulfur, and carbon monoxide have been proposed, but have either been found ineffective or resulted in a reaction product from which the aromatic amine could be separated only with considerable difficulty. It has also been proposed to reduce aromatic nitro compounds in the vapor phase by means of hydrogen in the presence of catalytic materials such as nickel, iron, copper, silver, platinum and zeolites, but it has been found the catalyst efficiency is low and the life of the catalyst short; also, due to the large heat of reaction the process is difficult to control.

It is an object of this invention to provide an improved process for the catalytic hydrogenation in the liquid phase of aromatic nitro, nitroso, nitrosamino, diazo, azo, azoxy, hydrazo or beta-hydroxylamino compounds.

I have discovered aromatic amines are efficiently produced by liquid phase catalytic hydrogenation of aromatic nitro, nitroso, nitrosamino, diazo, azo, azoxy, hydrazo or beta-hydroxylamino compounds and a high activity of catalyst is maintained when the process is carried out under conditions such that the finely divided catalyst body is maintained uniformly in suspension in the liquid and substantially all water formed in the reaction is removed from the reaction zone, i. e. no separate aqueous phase is formed and the catalyst surface is not wet with water.

I have further found that the nature of the solvent or medium in which the reaction is carried out affects the rate of the reaction; the use of the amine product resulting from the reaction as a solvent for the nitro compound or other reactant and the maintenance of the concentration of this solution so that the amino compound preponderates I have found greatly enhances the activity of the catalyst.

In practicing my invention a gas containing hydrogen is passed through a liquid comprising an aromatic nitro, nitroso, nitrosamino, azo, azoxy, hydrazo, beta-hydroxylamino or diazo compound (not including diazonium salts as they are relatively unstable) preferably dissolved in the aromatic amine which is the product of the reaction in such concentration that the mol ratio of compound to be reduced to amine solvent is less than 1. A catalyst comprising nickel, cobalt or copper, supported on a finely divided carrier such as kieselguhr, asbestos, pumice or other inert material is maintained in suspension in the liquid by the passage therethrough of a gas containing hydrogen. It has been found the catalyst shows greater activity when the concentration of the nitro compound or other compound to be reduced is relatively low, i. e. when the mol fraction of the amine solvent is greater than the mol fraction of the compound to be reduced. For example, in the hydrogenation of nitrobenzene a compostion of the liquid in the reaction zone of about 27% nitrobenzene and about 72% aniline was found desirable.

A catalyst suitable for use in the process of my invention may be formed by dissolving the basic carbonate of nickel, copper or cobalt in ammonium hydroxide solution or an ammonium salt solution capable of forming a soluble ammonia complex of the basic metal carbonate. The solution containing the ammonia complex of the metal carbonate is mixed well with an inert finely divided support such as kieselguhr, asbestos, pumice, silica, zeolite, or other material chemically inert with respect to components of the ammonia complex solution and components of the hydrogenation reaction, to saturate the surface of said inert material and form a thick paste; the paste thus formed is dried rapidly with agitation, screened, and thereafter reduced by heating in a stream of hydrogen. It is preferable that the prepared catalyst be of about 200-mesh fineness.

The temperature during hydrogenation may be in the range from room temperature up to temperatures in the neighborhood of the boiling point of the liquid under conditions of operation. In general, the rate of hydrogenation is greater at higher temperatures. A temperature in the neighborhood of 100° C. is considered advantageous in the hydrogenation of nitrobenzene to produce aniline because at this temperature the amount of impurities formed by side reactions is small and the water formed in the reaction is readily removed by the gas passing through the reaction zone.

The pressure during hydrogenation may be maintained at any value from atmospheric up to autoclave pressures (i. e. around 200 atmospheres). The rate of hydrogenation is approximately doubled by a tenfold increase in partial pressure of hydrogen. The hydrogenation of nitrobenzene to aniline may advantageously be carried out at a pressure of about 30 atmospheres to avoid the necessity of designing and building more costly equipment to accommodate higher pressures.

In practicing my invention it is advantageous to recirculate through the reaction zone the gas which has been withdrawn therefrom, after separation of a substantial part of the water vapor it has carried out of the reaction zone. The circulating gas is therefore cooled to condense the vapors (chiefly water vapor) carried out of the reaction zone and the gas is then recirculated with the addition of make-up hydrogen into the reaction zone. The circulating gas may be constituted chiefly of an inert gas, such as nitrogen, with a small concentration of hydrogen, and a portion of the circulating gas may be bled and discarded to compensate for inert gases added with the make-up hydrogen. The circulation of a considerable quantity of gas is advantageous in that the circulating gas acts as a carrier for removal of water vapor from the reaction zone and a large quantity of gas therefore removes the water effectively. In addition to removing the water formed in the reaction the circulating gas maintains the particles of catalyst carrier in suspension. The quantity of circulating gas needed to remove sufficient water to prevent formation of a separate aqueous phase will be determined by the temperature and pressure in the reaction zone and the vapor pressure of the reaction mixture components at that temperature. The quantity of circulating gas needed to maintain the catalyst in suspension will be determined by the design of the hydrogenator equipment and the degree of subdivision of the catalyst carrier.

The hydrogen used in the operation of my process need not be a pure hydrogen, but may be admixed with a considerable amount of inert gases and the concentration of inerts may be allowed to build up in the circulating gas system, since a large volume of circulating gas is advantageous, as indicated above. For example, the gas mixture of $3H_2$ to $1N_2$ used for ammonia synthesis is suitable as a source of hydrogen for the process of my invention, or the gas mixture bled from an ammonia synthesis system may be scrubbed to remove ammonia and thereafter used as make-up gas in my process.

In the accompanying drawing there is shown for purposes of exemplification a flow sheet of a process embodying my invention as applied to the production of aniline from nitrobenzene.

Reference numerals 1 and 2 denote towers in which the hydrogenation reaction is carried out, preferably at a temperature of about 100° C. and a total gas pressure of about 30 atmospheres. Make-up nitrobenzene enters through the duct 3 and catalyst through the duct 4. A gas containing hydrogen and nitrogen in a mol ratio of 1:9 is circulated in parallel through the two towers by means of a pump 5. The circulating gas leaving the towers is cooled in the condenser 6 and the condensate is collected in the primary separator 7. The gas from which the vapors have been condensed leaves the separator through the duct 8 and is recirculated to the towers by the pump 5. Make-up hydrogen is introduced through the conduit 22 and inert gas may be bled from the circulating system through the vent 23.

Primary hydrogenation of nitrobenzene in aniline solution takes place in tower 1 and reaction mixture from tower 1 is passed to tower 2 through the duct 9 for final hydrogenation. The reaction mixture is then withdrawn from tower 2 through the duct 10 and is filtered in the press 11 to remove spent catalyst. The pressure on the liquid is released to about atmospheric through the filter press and the filtrate is passed to the secondary separator 12.

When the hydrogenation towers are operated at a temperature of about 100° C. the vapors carried out by the circulating gases are constituted chiefly of water vapor, together with a smaller amount of aniline vapor. The condensate collected in the primary separator 7 separates readily into an aqueous phase and an aniline phase, since the mutual solubilities of water and aniline at ordinary temperatures are very low and there is no tendency to form stable emulsions. The aniline phase thus separated is returned to tower 2 for further hydrogenation; the water phase is sent to the secondary separator 12 through a pressure release valve which reduces the pressure on the liquid to about atmospheric.

Two liquid reaction products are thus obtained in the separator 12, water containing a small quantity of aniline in solution and aniline containing a small quantity of water and unreacted nitrobenzene in solution. At 30° C. the water layer contains about 3.6% by weight of aniline and the aniline layer about 5.4% by weight of water, plus a small amount of nitrobenzene. A study of the relation between vapor and liquid compositions and boiling point temperatures in the aniline-water system shows there are two immiscible liquid phases at the normal boiling point, slightly below 100° C., one consisting of aniline containing a small amount of water in solution, and the other of water containing a small amount of aniline in solution. A mixture of these two liquids at the boiling point, is, of course, in equilibrium with a single vapor phase, namely, one containing 16.5% aniline and 83.5% water by weight, a composition intermediate between those of the two immiscible liquids. Each of the liquid products collected in separator 12 may therefore be fractionated to remove a distillate containing about 83.5% water and to leave a still residue comprising substantially pure water when the water layer is fractionated and comprising substantially pure aniline (together with a small quantity of unreacted nitrobenzene) when the aniline layer is fractionated.

The fractionation of the water layer is carried out continuously in still 13 and the aniline layer is continuously fractionated in the still 14. In each case the distillate is condensed and the condensate allowed to separate into two liquid phases, the condenser 15 and separator 16 being associated with the still 13 and the condenser 17 and separator 18 with the still 14. The water layer from each of the separators 16 and 18, comprising about 96.4% $H_2O$, is continuously fed to the water still 13 along with the water layer from the separator 12; the aniline layer from each of the separators 16 and 18, comprising about 94.6% aniline, is continuously fed to the aniline still 14 along with the aniline layer from the separator 12. Water is continuously discharged from the still 13 and discarded, and aniline containing small amounts of unreacted nitrobenzene is continuously discharged from the still 14 and is fractionated in the still 19 to obtain a pure aniline product as a distillate which is condensed in the condenser 20 and withdrawn from a reflux chamber 21. The residue from the still 19, a product rich in nitrobenzene, is continuously withdrawn and returned to the hydrogenator tower 1.

In the following example of the hydrogenation of nitrobenzene, according to the process illustrated on the flow sheet, all quantities are based on the production of one ton (21.5 pound mols) of aniline per day.

Nitrobenzene dissolved in aniline was hydrogenated in towers 1 and 2 at a temperature of about 100° C. and a total gas pressure of about 30 atmospheres. Once each day the contents of tower 2 were discharged to filter 11, and tower 2 was refilled with one-third the contents of tower 1. After discharge of one-third of the contents of tower 1 to tower 2, make-up nitrobenzene and catalyst were added to tower 1.

The daily input to tower 1 was as follows:

Make-up nitrobenzene_____lb. mols__ 21.5
Nitrobenzene returned from still 19
    lb. mol__ .11
Aniline accompanying nitrobenzene from still 19 _____lb. mol__ .11
Catalyst (a nickel-kieselguhr preparation containing 14% Ni)_____lbs__ 31.9

In order to maintain a low concentration of nitrobenzene in tower 1 it was considered preferable not to add all make-up nitrobenzene at one time, but to distribute its addition over the course of the day. Before discharge of one-third of its contents to tower 2, the composition of the reaction mixture in tower 1 was approximately as follows:

Aniline _____lb. mols__ 55.4
Nitrobenzene _____lb. mols__ 9.76
Catalyst _____lbs__ 95.7 plus a small amount of water in solution in the aniline. One-third of this reaction mixture was passed each day to tower 2 and there hydrogenated for one day. The daily material balance for tower 2 (aside from water) was as follows:

|  | Input | Discharge |
|---|---|---|
| Aniline_____lb. mols__ | 18.47 | 21.61 |
| Nitrobenzene_____lb. mols__ | 3.25 | .11 |
| Catalyst_____lbs__ | 31.9 | 31.9 |

The reaction mixture discharged from tower 2, therefore, contained about 0.5% unreduced nitrobenzene and the hydrogenation load was distributed between towers 1 and 2 as follows:

Per cent
Tower 1 _____ 85.4
Tower 2 _____ 14.6

The heat of reaction was sufficient to maintain the hydrogenators at a temperature of 100° C., allowing for heat losses.

A gas mixture comprising hydrogen and nitrogen in the molar proportion 1:9 and at a pressure of 30 atmospheres was continuously circulated in parallel through the two towers at the rate of 3,000 pound mols per day. Less than 1,000 pound mols of circulating gas would have been sufficient to remove the water under the conditions of operation, but the increased quantity of gas was found advantageous to maintain the catalyst in suspension in the liquid. The circulating gas was cooled in condenser 6 to condense vapors contained therein, make-up gas containing a molar proportion of $3H_2$ to $1N_2$ was continuously added to the circulating gas, and a quantity of gas containing an equivalent amount of nitrogen was bled from the circulating gas mixture of $1H_2$ to $9N_2$ and discarded. 96.3% of the hydrogen entering in the make-up gas was thus utilized in the hydrogenation reaction.

The condensate removed from the gas was separated into two liquid layers in the separator 7. The aniline layer was continuously returned to tower 2 for further hydrogenation; the water layer, comprising a daily total of about 25 pounds of aniline and 665 pounds of water, was sent to the separator 12 and there combined with the filtrate from filter press 11, comprising a daily total of about 1,985 pounds aniline, 109 pounds water and 13 pounds nitrobenzene.

The water layers from separators 12, 16 and 18 were continuously fractionated in still 13; 774 pounds of water per day were withdrawn and discarded. The aniline layers from separators 12, 16 and 18 were continuously fractionated in still 14 to give a residue free from water, amounting to about 2,010 pounds aniline and 13 pounds nitrobenzene daily, which was continuously withdrawn and conducted to the still 19. The distillate from each of the stills 13 and 14, comprising a vapor containing 16.5% aniline and 83.5% water, was condensed and separated into two liquid layers in the separators 16 and 18 respectively. About 13 pounds nitrobenzene per day, accompanied by about 10 pounds aniline, were withdrawn as a residue from still 19 and returned to tower 1. The aniline product (about one ton per day) was withdrawn from reflux chamber 21.

The catalyst used in the above-described illustrative process consisted of metallic nickel uniformly distributed over the surface of finely divided kieselguhr particles; its preparation is described in detail in my copending application Serial No. 288,583, filed August 5, 1939. The addition of 31.9 pounds of catalyst material to the hydrogenator for every 21.5 pound mols of make-up nitrobenzene resulted in an average catalyst concentration in the liquid of about 1.5% by weight. Since one-third the contents of tower 1 was discharged each day and hydrogenated an additional day in tower 2, the average period of use of the catalyst material was 4 days. Under these conditions of operation it was found the useful life of catalyst material discharged to filter 11 was substantially exhausted; the catalyst material removed in the filter was therefore withdrawn from the process. Operating with higher concentrations of catalyst in the hydrogenation towers increases the rate of hydrogenation, but in such operation four days' use of the catalyst does not exhaust its useful life; a portion of the catalyst separated by filtration may therefore be returned to the hydrogenator, if desired.

A process for hydrogenation, according to my invention, may be carried out with arrangements of liquid and catalyst transfer and gas flow other than that described above. For example, only one hydrogenation tower or any desired number of hydrogenation towers may be employed; when more than one tower is used, both gas and liquid may be passed in series either cocurrently or countercurrently through the towers, both may be passed in parallel through the towers, or the liquid may be passed in series through the towers while the gas is passed in parallel therethrough or conversely the gas may be passed in series and the liquid in parallel. Fresh catalyst may be introduced into each tower or catalyst may be transferred between towers countercurrent to the flow of liquid, e. g. fresh catalyst may be introduced into tower 2 in the illustrated process and, after filtration from tower 2 effluent (without exposure to air), the catalyst may be transferred to tower 1 and eventually filtered from tower 1 effluent. Such an arrangement would provide unusually high catalyst activity in tower 2. Moreover, the process for hydrogenation according to my invention may be carried out with continuous introduction of liquids and continuous withdrawal of reaction mixture if so desired. When two hydrogenating towers are used and the first tower carries a proportionately greater share of the hydrogenation load, as in the above-described process for hydrogenating nitrobenzene, the second tower may be placed within the first in order to equalize the heating effect of the heat liberated by the reaction.

I have described above the reduction of nitrobenzene to aniline by the process of my invention. In like manner many other aromatic nitrogen compounds may be reduced; for example, the substances listed below may be hydrogenated to form the aromatic amine product indicated:

| Initial material | Product |
| --- | --- |
| o-Nitrotoluene | o-Toluidine. |
| α-Nitronaphthalene | α-Naphthylamine. |
| m-Dinitrobenzene | m-Diaminobenzene. |
| Nitrosobenzene | Aniline. |
| p-Nitroso dimethyl aniline | p-Amino dimethyl aniline. |
| p-Nitroso phenol | p-Amino phenol. |
| Azobenzene | Aniline. |
| Azoxybenzene | Do. |
| Hydrazobenzene | Do. |
| Diazoaminobenzene | Do. |
| β-phenylhydroxylamine | Do. |

Hydrogenation of nitroso compounds and diazo compounds may be particularly advantageous in cases where nitrosyl chloride is available for use as nitrosation or diazotizing agent. For example, to prepare p-amino phenol, phenol may be treated with nitrosyl chloride to form p-nitroso phenol in accordance with the process of United States Patent 2,074,127 and the p-nitroso phenol hydrogenated in accordance with my invention to produce p-amino phenol. Diazoaminobenzene, prepared by treating aniline with nitrosyl chloride in accordance with the process of United States Patent 2,133,037, may be hydrogenated in accordance with my invention to form aniline; such a process may be employed to separate aniline from impurities which are not easily separated by ordinary means.

Suitable materials of construction for handling mixtures of aromatic nitro compounds, their reduction products and water include aluminum, cast iron and 28% chrome steel.

The above description of processes for hydrogenation are intended for purposes of exemplification only; my invention is not to be limited in any way except as defined in the appended claims.

What is claimed is:

1. A process for production of aromatic amines comprising reacting hydrogen in the presence of a catalyst with a substance from the group nitro, nitroso, nitrosamino, azoxy and beta-hydroxylamino compounds of the benzene and naphthalene series in the liquid phase while removing water formed during the reaction to prevent wetting of the catalyst by said water.

2. A process for production of an aromatic amine by catalytic hydrogenation of a substance from the group nitro, nitroso, nitrosamino, azoxy and beta-hydroxylamino compounds of the benzene and naphthalene series, comprising dissolving the substance to be hydrogenated in the said aromatic amine, introducing into said solution a catalyst consisting of a metal from the group nickel, cobalt and copper, supported on particles of an inert carrier material, and passing hydrogen through the liquid at a rate sufficient to bring about hydrogenation of said substance, to maintain said catalyst in suspension and to remove a sufficient amount of water produced in the hydrogenation reaction to prevent wetting of the catalyst body by water.

3. A liquid phase process for the production of aniline by the catalytic hydrogenation of nitrobenzene which comprises dissolving said nitrobenzene in aniline to form a solution containing a major proportion of aniline, suspending in said solution a hydrogenation catalyst, passing hydrogen through said solution at a rate sufficient to bring about hydrogenation of the nitrobenzene, to maintain said catalyst in suspension and to remove a sufficient amount of the water produced in the hydrogenation reaction to prevent substantial wetting of the catalyst by water.

4. A process for production of aniline by catalytic hydrogenation of nitrobenzene which comprises dissolving said nitrobenzene in aniline, suspending in the solution a catalyst consisting of nickel supported on particles of an inert carrier material, maintaining said solution at a temperature of about 100° C., and passing hydrogen through said solution at a rate sufficient to bring about hydrogenation of the nitrobenzene, to maintain said catalyst in suspension and to remove from the solution a sufficient amount of water produced in the hydrogenation reaction to prevent formation of a separate aqueous phase in the reaction zone.

5. A process for production of aromatic amines comprising hydrogenating a substance from the group nitro, nitroso, nitrosamino, azoxy, and beta-hydroxylamino compounds of the benzene and naphthalene series in the liquid phase in the presence of a catalyst while maintaining the hydrogenation zone substantially free from an aqueous liquid phase.

6. A process for production of an aromatic amine comprising subjecting a substance from the group nitro, nitroso, nitrosamino, azoxy, and beta-hydroxylamino compounds of the benzene and naphthalene series to hydrogenation in the liquid phase in the presence of a catalyst consisting of a metal effective to catalyze hydrogenation reactions, supported on particles of an inert carrier material, while removing water formed during the reaction so that the catalyst is not wet by said water.

7. A process for production of an aromatic amine which comprises hydrogenating a substance from the group nitro, nitroso, nitrosamino, azoxy, and beta-hydroxylamino compounds of the benzene and naphthalene series by passing hydrogen into contact with said substance in a liquid phase in the presence of a hydrogenation catalyst, a sufficient quantity of gas being passed through the liquid to remove as vapor substantially all the water formed in the reaction.

8. A process for production of an aromatic amine which comprises hydrogenating a substance from the group nitro, nitroso, nitrosamino, azoxy, and beta-hydroxylamino compounds of the benzene and naphthalene series by introducing into said substance in a liquid phase a catalyst consisting of a metal supported on particles of an inert carrier material and passing hydrogen through said liquid at a rate sufficient to bring about hydrogenation of said substance, to maintain said catalyst in suspension, and to remove as vapor from the hydrogenation zone substantially all the water produced in the hydrogenation reaction.

9. A process for production of an aromatic amine which comprises catalytically hydrogenating a substance from the group nitro, nitroso, nitrosamino, azoxy, and beta-hydroxylamino compounds of the benzene and naphthalene series by introducing into said substance in a liquid phase a catalyst consisting of a metal from the group nickel, cobalt and copper supported on particles of an inert carrier material, and passing through said liquid at a rate sufficient to bring about hydrogenation of said substance, to maintain said catalyst in suspension, and to remove as vapor from the hydrogenation zone a sufficient amount of the water produced in a hydrogenation reaction to prevent formation of a separate aqueous phase.

10. A process for production of an aromatic amine which comprises catalytically hydrogenating a substance from the group nitro, nitroso, nitrosamino, azoxy, and beta-hydroxylamino compounds of the benzene and naphthalene series by dissolving said substance in a body of the said aromatic amine, suspending in the solution a catalyst consisting of a metal from the group nickel, cobalt and copper supported on particles of an inert carrier material, maintaining the resulting suspension at a temperature of about 100° C., passing hydrogen through said liquid at a rate sufficient to bring about hydrogenation of said substance, to maintain said catalyst in suspension, and to remove in vapor form from said solution substantially all the water produced in the hydrogenation reaction, thereafter cooling said gas to condense water vapor therefrom, recirculating said gas together with added hydrogen through said liquid, and withdrawing hydrogenated liquid from the reaction zone.

11. A process for production of aniline which comprises subjecting nitrobenzene to catalytic hydrogenation in the liquid phase by passing hydrogen through a body of nitrobenzene in contact with a hydrogenation catalyst at a rate sufficient to bring about hydrogenation of the nitrobenzene and to remove in vapor form from the zone of reaction water formed in the reaction so as to avoid substantial wetting of the catalyst by water.

MEARL A. KISE.

CERTIFICATE OF CORRECTION.

Patent No. 2,292,879.  August 11, 1942.

MEARL A. KISE.

It is hereby certified that error appears in the printed specification of the above numbered patent requiring correction as follows: Page 5, first column, line 21, claim 9, after the word "passing" insert --hydrogen--; and that the said Letters Patent should be read with this correction therein that the same may conform to the record of the case in the Patent Office.

Signed and sealed this 20th day of October, A. D. 1942.

(Seal)

Henry Van Arsdale,
Acting Commissioner of Patents.